UNITED STATES PATENT OFFICE.

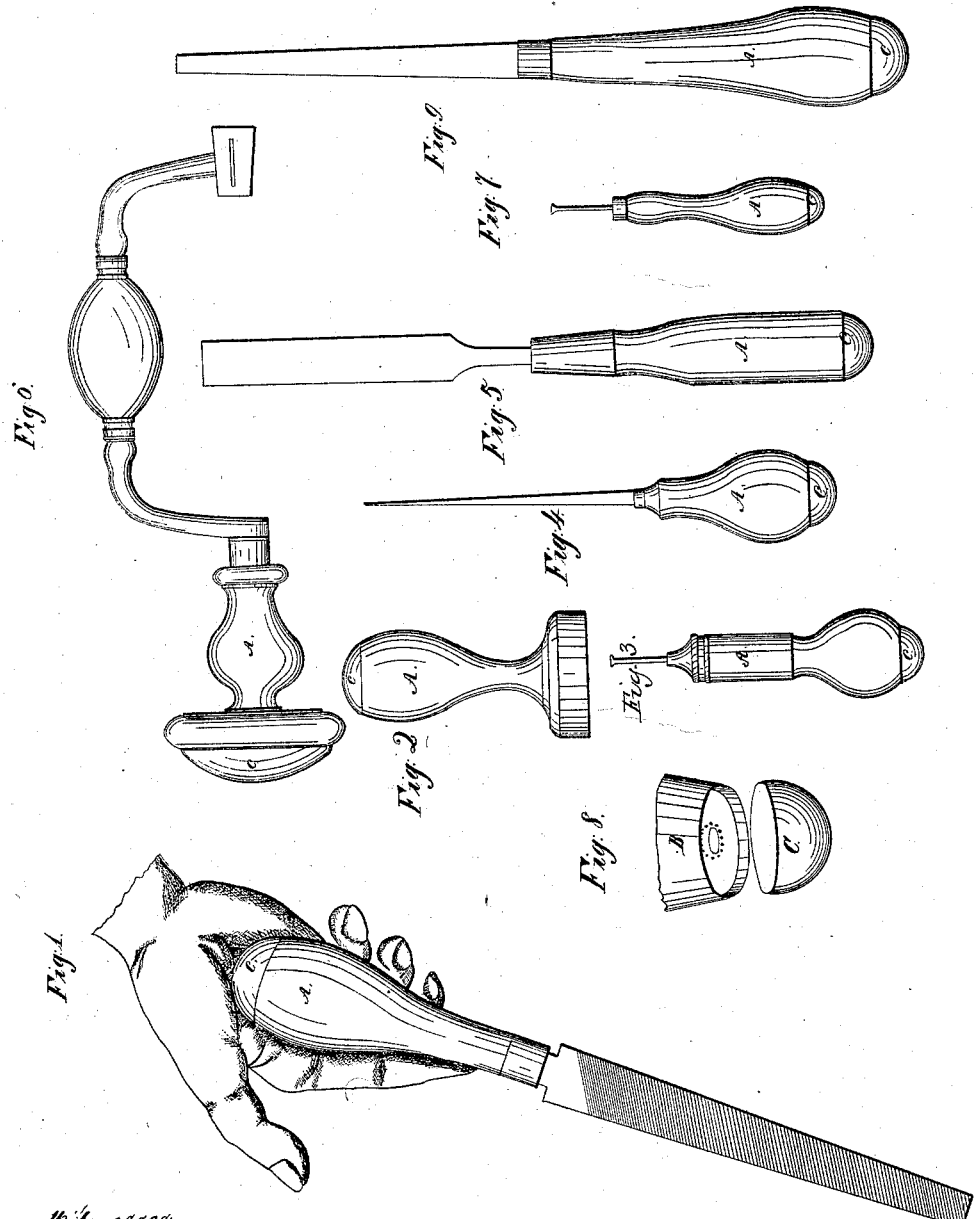

ISAAC S. CLOUGH, OF BROOKLYN, NEW YORK, AND JOHN N. BUNNELL, OF UNIONVILLE, CONNECTICUT.

IMPROVEMENT IN TOOL-HANDLES.

Specification forming part of Letters Patent No. 37,333, dated January 6, 1863.

*To all whom it may concern:*

Be it known that we, ISAAC S. CLOUGH, of Brooklyn, Kings county, State of New York and JOHN N. BUNNELL, of Unionville, town of Farmington, county of Hartford, State of Connecticut, have invented, made, and applied to use certain new and useful Improvements in the Construction and Operation of Tool-Handles; and we do declare the following to be a full, clear, and correct description of the same, reference being had to the accompanying drawings, making part of this specification, and to the letters of reference marked thereon, in which—

Figure 1 is a view showing our improvement applied to the handle of a file. Fig. 2 shows our improvement applied to a hand-stamp. Fig. 3 shows our improvement applied to a tool-box handle. Fig. 4 shows our improvement applied to an ice-pick handle. Fig. 5 shows our improvement applied to a chisel-handle. Fig. 6 shows our improvement applied to the handle of a bit-stock. Fig. 7 shows our improvement applied to a shoemaker's awl; Fig. 8 a detached view showing the rubber cushion and handle excavated for its reception. Fig. 9 shows our improvement applied to the handle of a screw-driver.

In the drawings like parts of the invention are designated by the same letters of reference.

The nature of our invention consists in the use or employment of a rubber cushion placed or attached directly upon the head of a tool-handle, in the manner and for the purpose hereinafter fully shown.

To enable others skilled in the art to make and use our invention, we will speak of the construction and operation of the same.

Prior to our invention, when tools of various kinds, as shown in the drawings, were used, direct contact between the head of the handle of the tool used and the hand of the party using the same took place. Unless the hand of the operator is hardened by constant use of the tool, the hand becomes blistered and chafed.

Our invention is intended to prevent this blistering, chafing, or any unpleasant effect upon the hand of the operator in using the tool, and at the same time afford the same facility for operating the tool as previously existed.

A shows the handle of the tool, and B is the head of the same. The head B is cut out a sufficient space for the reception of the cushion of rubber C. In cutting out this space in the head B the outer edge of the same is left as at $b$, forming a rim and serving to confine the rubber cushion C inserted within the same. This rubber cushion C is spherical in shape, and is applied to the handle A, as shown in Fig. 8. The rubber, from its flexibility and elasticity, protects the hand of the operator using the tool, while it affords facility in operating the same.

Having thus set forth our invention, what we claim as new, and desire to secure by Letters Patent, is—

In combination with the tool-handle, the india-rubber cushion, applied as shown, for the purpose specified.

I. S. CLOUGH.
JOHN N. BUNNELL.

In presence of—
D. C. HOOKER,
A. SIDNEY DOANE.